(12) United States Patent  
Jain et al.

(10) Patent No.: US 9,253,226 B2
(45) Date of Patent: Feb. 2, 2016

(54) GUIDED EDIT OPTIMIZATION

(71) Applicant: LinkedIn Corporation, Mountain View, CA (US)

(72) Inventors: Aastha Jain, Sunnyvale, CA (US); Gloria Lau, Los Altos, CA (US); Vitaly Gordon, Mountain View, CA (US); Jason Schissel, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/319,521

(22) Filed: Jun. 30, 2014

(65) Prior Publication Data

US 2015/0381670 A1  Dec. 31, 2015

(51) Int. Cl.
*G06F 3/048* (2013.01)
*H04L 29/06* (2006.01)
*G06F 3/0481* (2013.01)
*G06F 17/30* (2006.01)
*G06Q 50/00* (2012.01)

(52) U.S. Cl.
CPC ............ *H04L 65/403* (2013.01); *G06F 3/0481* (2013.01); *G06F 17/30035* (2013.01); *G06Q 50/01* (2013.01)

(58) Field of Classification Search
CPC .................. G06F 17/30029; G06F 17/30035; G06F 17/30702; G06F 3/048; G06Q 50/01
USPC ........................................................ 715/753
See application file for complete search history.

(56) References Cited

U.S. PATENT DOCUMENTS

| 2010/0077327 | A1* | 3/2010 | Pulsipher et al. ............. 715/764 |
| 2013/0204966 | A1* | 8/2013 | Lee .................... G06Q 30/0243 709/217 |
| 2014/0031130 | A1* | 1/2014 | Janakiraman et al. .......... 463/42 |
| 2014/0074653 | A1* | 3/2014 | Wang et al. ................. 705/26.7 |
| 2014/0137004 | A1* | 5/2014 | Berger et al. ................ 715/760 |
| 2014/0143325 | A1* | 5/2014 | Lessin et al. ................. 709/204 |

* cited by examiner

*Primary Examiner* — Dino Kujundzic
(74) *Attorney, Agent, or Firm* — Schwegman Lundberg & Woessner, P.A.

(57) ABSTRACT

Techniques for optimizing a guided edit process for editing a member profile page are described. According to various embodiments, profile edit task information associated with a member of an online social network service is accessed, the profile edit task information identifying one or more candidate profile edit tasks to be performed to update a member profile page of the member. Thereafter, if it is determined that the member recently completed a difficult profile edit task, a difficult candidate profile edit task is identified, and the member is prompted to perform the difficult candidate profile edit task. If it is determined that the member has not recently completed a difficult profile edit task, an easy candidate profile edit task is identified, and the member is prompted to perform the easy candidate profile edit task.

20 Claims, 11 Drawing Sheets

GUIDED EDIT OPTIMIZATION

TECHNICAL FIELD

The present application relates generally to data processing systems and, in one specific example, to techniques for optimizing a guided edit process for editing a member profile page.

BACKGROUND

Online social network services such as LinkedIn® are becoming increasingly popular, with many such websites boasting millions of active members. Each member of the online social network service is able to upload an editable member profile page to the online social network service. The member profile page may include various information about the member, such as the member's biographical information, photographs of the member, and information describing the member's employment history, education history, skills, experience, activities, and the like. Such member profile pages of the networking website are viewable by, for example, other members of the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for optimizing a guided edit process for editing a member profile page are described. In the following description, for purposes of explanation, numerous specific details are set forth in order to provide a thorough understanding of example embodiments. It will be evident, however, to one skilled in the art that the present invention may be practiced without these specific details.

Briefly, an existing guided profile edit feature of the online social network service LinkedIn® prompts members to perform profile edit tasks in connection with their member profile (such as adding photos or information to their profile). Currently, there is a predetermined order of profile edit tasks which are displayed to every member. Moreover, a particular profile edit task is repeatedly displayed to the member, until that member either completes or skips that profile edit task. Various techniques described herein dynamically optimize the order in which profile edit tasks are displayed to a member, in order to maximize the efficient completion of profile edit tasks by the member.

Figure 1:
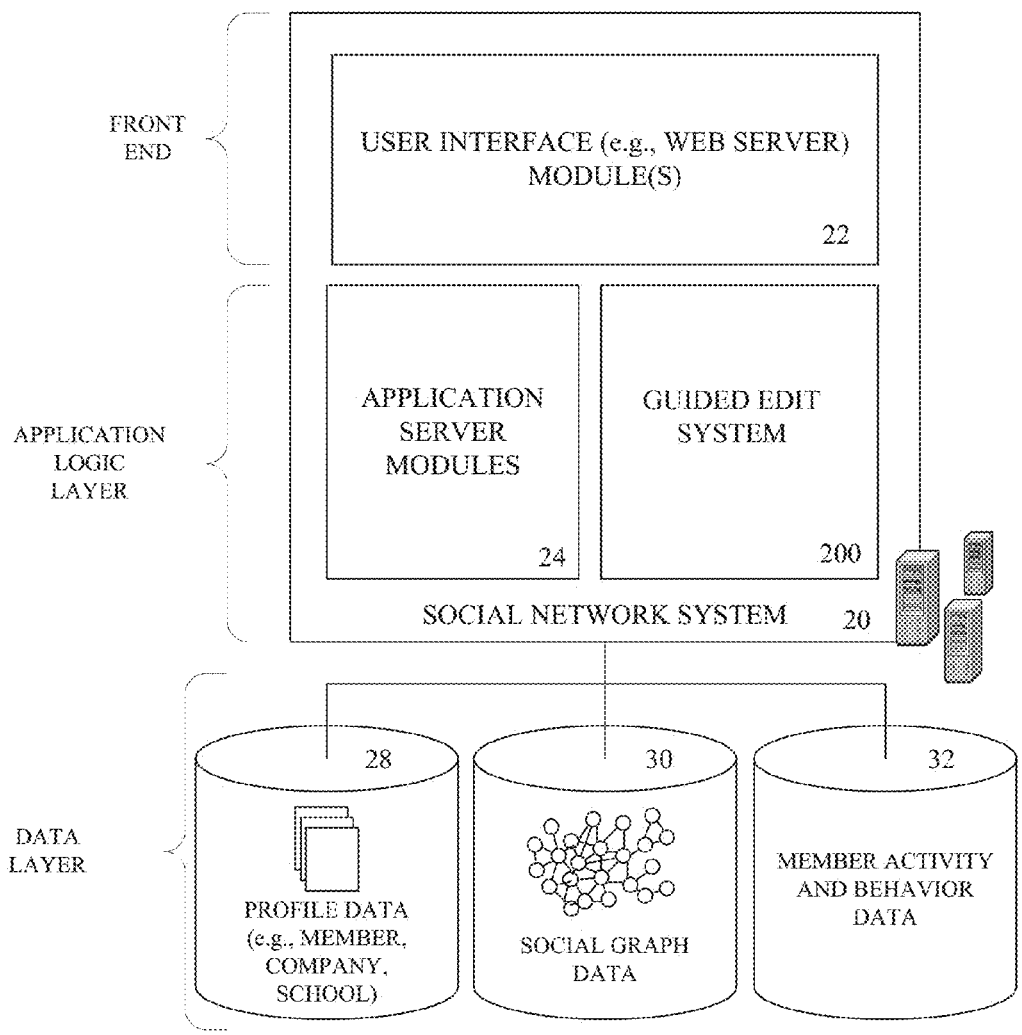
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 24, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a guided edit system 200. The guided edit system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
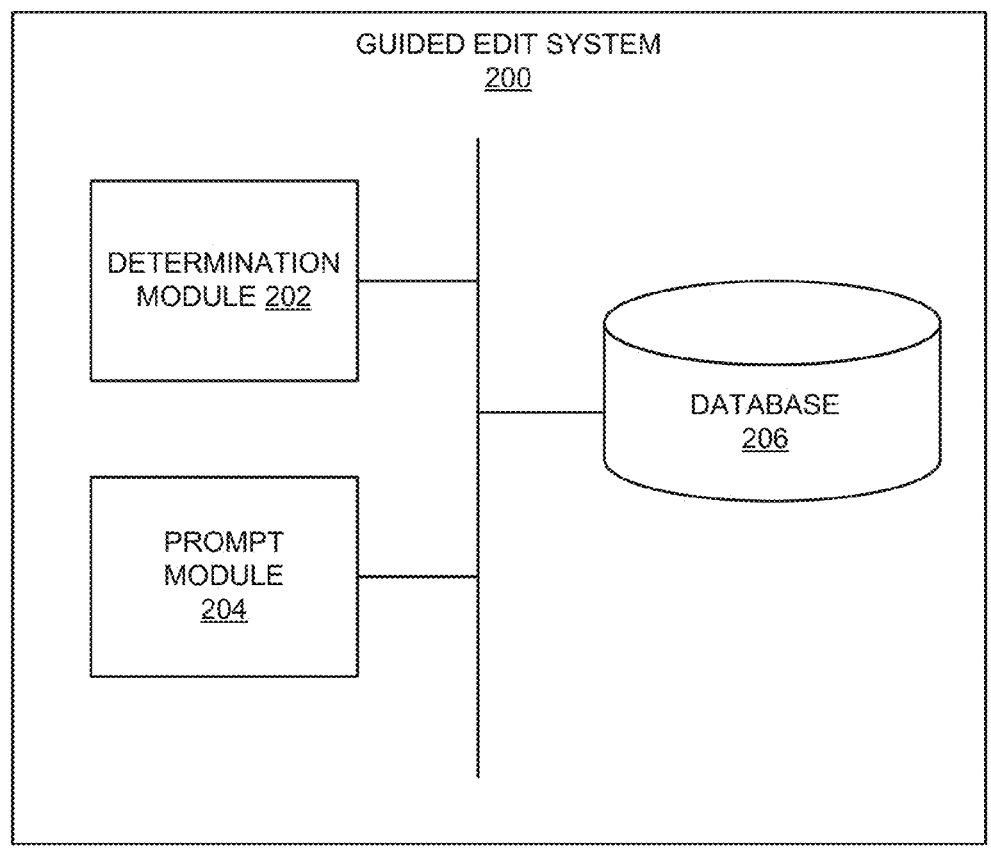
FIG. 2 is a block diagram of an example system, according to various embodiments.

Turning now to FIG. 2, a guided edit system 200 includes a determination module 202, a prompt module 204, and a database 206. The modules of the guided edit system 200 may be implemented on or executed by a single device such as a guided edit device, or on separate devices interconnected via a network. The aforementioned guided edit device may be, for example, one or more client machines or application servers. The operation of each of the aforementioned modules of the guided edit system 200 will now be described in greater detail below.

Figure 3:
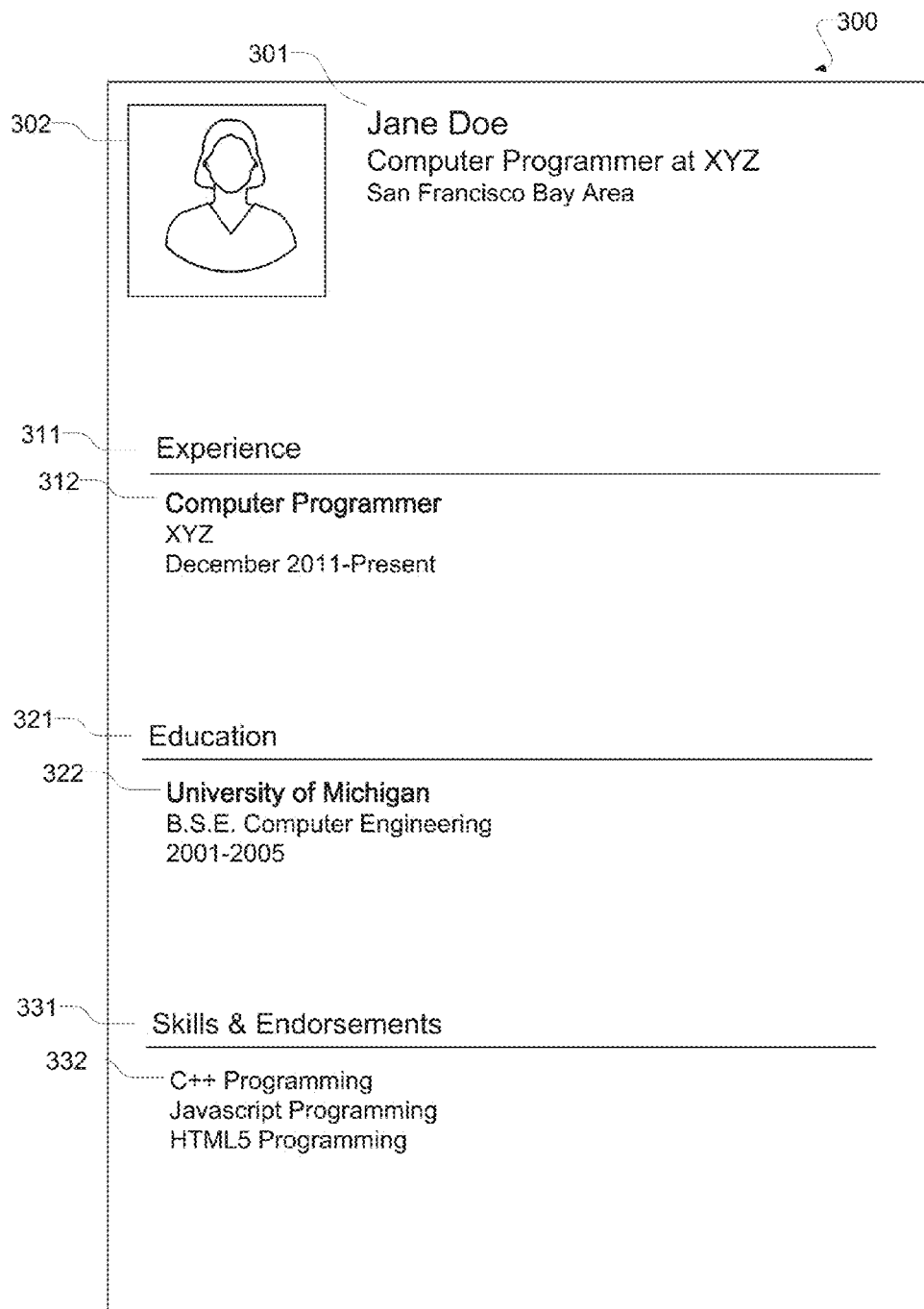
FIG. 3 illustrates an example portion of a member profile page, according to various embodiments.

Generally, each member of an online social network service (such as LinkedIn®) has a member profile page that includes various information about that member. An example member profile page 300 of an example member "Jane Doe" is illustrated in FIG. 3. As seen in FIG. 3, the member profile page 300 includes identification information 301, such as the member's name ("Jane Doe"), member's current position, ("Computer Programmer at XYZ"), and geographic address/location information ("San Francisco Bay Area"). The member's profile page 300 also includes a photo area 302 for displaying a photograph of the member. Further, the member profile page 300 includes various sections (also known as fields). For example, member profile page 300 includes an experience section 311 including listings of past or present experience positions of the member (e.g., employment/volunteer experience position 312), an education section 321 including listings of past or present educational credentials of the member (e.g., university degree or diploma 322 earned or currently being earned by the member), and a skills & endorsements section 331 including listings of various skills of the member and endorsements of those skill listings by other members. Member profile page 300 is merely exemplary, and while the member profile page 300 includes certain sections (e.g., experience sections and education sections), these sections or fields may be supplemented or replaced by other sections or fields (e.g., a general portfolio section/field, an art portfolio section/field, a music portfolio section/field, a photography portfolio section/field, a multimedia section/field, a volunteer section/field, and so forth). A member profile page may include other information, such as various identification information (name, username, social media handle, email address, geographic address, networks, location, phone number, fax number, etc.), past or present education information, past or present employment information, past or present volunteer information, resume information, skills, endorsements, recommendations, title, industry, company size, seniority level, activities, group membership, images, photos, preferences, news, status, links or URLs on the profile page, and so forth.

Figure 4:
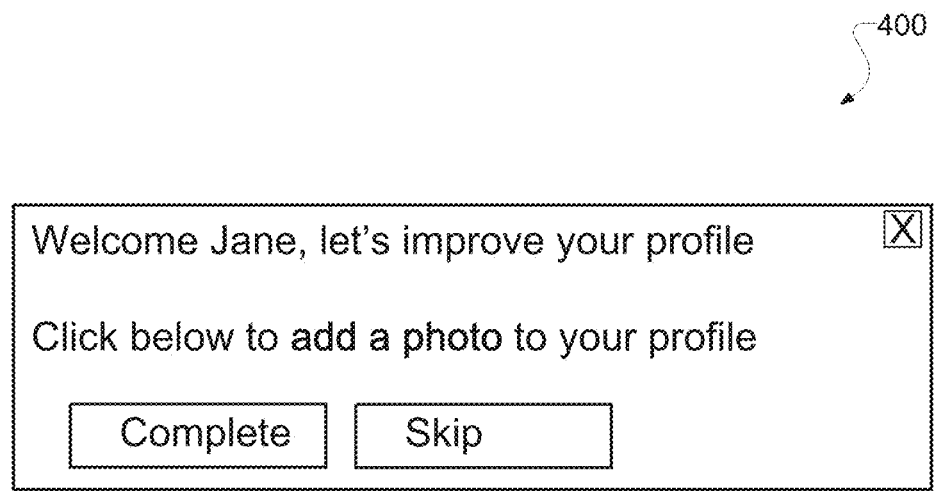
FIG. 4 illustrates an example portion of a prompt for a profile edit task, according to various embodiments.

It is often challenging for members to update the information on their profile or otherwise make their profile as complete as possible. Accordingly, social network services such as LinkedIn® include a "guided profile edit" or "guided edit" feature that assists members in editing profile pages by performing various profile edit tasks. For example, the system may maintain a list of profile edit tasks that need to be performed in order to complete a member profile page (e.g., add title, add photo, add employment history, add education history, add skills, add profile summary, add any other attributes described above in conjunction with FIG. 3, etc.). Thereafter, a guided edit system may display prompts (e.g., see prompt 400 in FIG. 4) associated with each outstanding profile edit task in the list (that is, each profile edit task in the list that has not been completed). In some embodiments, the list of profile edit tasks may have a particular or fixed order. For example, this list of profile edit tasks may have a predetermined order that is defined manually. Accordingly, the guided edit system may display prompts associated with each outstanding profile edit task based on their order in the list. For example, if the list includes tasks A, B, C, and D, the system will prompt the member to perform task A until task A is performed or skipped, and then the system will prompt the member to perform task B, and so on. Thus, conventionally, if a profile edit task is outstanding and needs to be performed, the guided edit system will display this profile edit task repeatedly until the member finishes the task (e.g., by clicking on the "Complete" button illustrated in FIG. 4) or until the member affirmatively skips the task to proceed to the next task in the ordered list (e.g., by clicking on the "Skip" button illustrated in FIG. 4).

As described in various embodiments herein, the guided edit system 200 is configured to order or reorder the list of profile edit tasks in order to optimize the profile editing process for members. For example, in some embodiments, the guided edit system 200 may reorder the list of profile edit tasks based on a response metric associated with each profile edit task. An example of a response metric associated with a profile edit task is a click through rate or CTR (e.g., representing the amount of clicks on the "Complete" button in FIG. 4 in comparison to the number of impressions of the prompt 400). In some embodiments, the task with the highest CTR may be placed at the top of the re-ordered list, the task with the second highest CTR may be placed second in the list, and so on, and the system 200 may prompt the member to perform each task based on the updated ordering of the list. Thus, the guided edit system 200 may prompt the member to perform the task with the highest CTR first, and then once the member finishes or skips that task, the guided edit system 200 may prompt the member to perform the task with the next highest CTR, and so on. In some embodiments, the guided edit system 200 may prompt the member by displaying a prompt via a user interface on a client device, where the prompt invites the member to update their member profile page by performing a specific profile edit task (e.g., see FIG. 4). In some embodiments, the guided edit system 200 may prompt the member by transmitting a message to the member that invites the member to update their member profile page by performing a specific profile edit task. In some examples, the message may be an email, a text message (e.g., short message service (SMS) message or multimedia messaging service (MMS) message), a social network instant message, a chat message, etc.

Figure 5A:
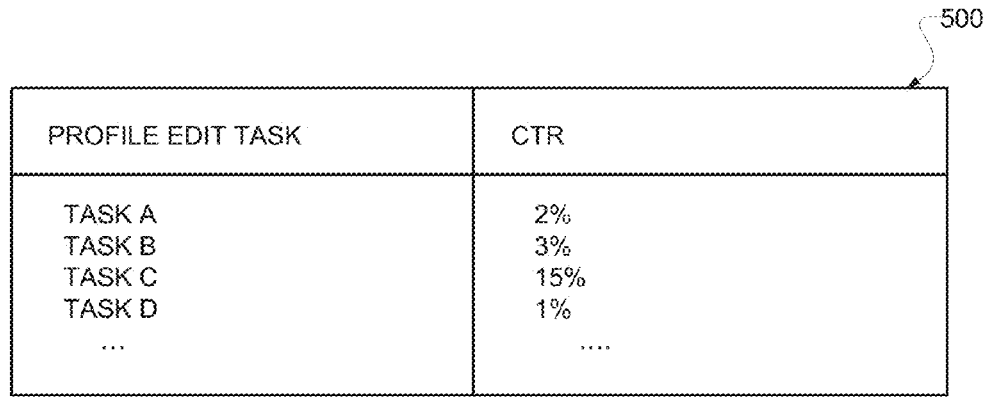
FIG. 5A illustrates an example of response metric information, according to various embodiments.

The system 200 may identify the response metrics associated with each task by accessing response metric information identifying a response metric value (e.g., CTR) associated with each of various tasks, such as response metric information 500 illustrated in FIG. 5A. Such response metric information may be stored locally at, for example, the database 206 illustrated in FIG. 2, or may be stored remotely at a database, data repository, storage server, etc., that is accessible by the guided edit system 200 via a network (e.g., the Internet). In some embodiments, the guided edit system 200 may generate the response metric information itself by accessing log history information (e.g., see database 32 in FIG. 1) identifying historical responses to profile edit task prompts by members of an online social network service. In some embodiments, the response metrics described herein may correspond to any type of metric or measurement of how a member interacts with a prompt, or how a member performs a task. For example, the response metric may measure how many members actually complete a given profile edit task.

Figure 5B:
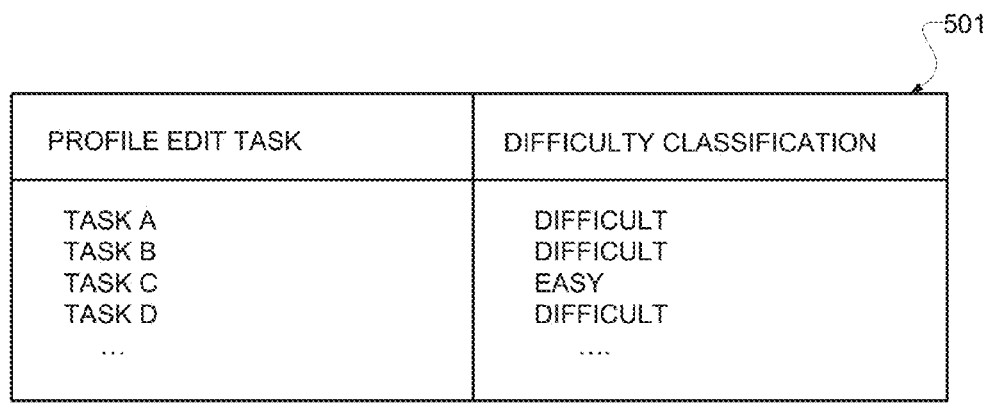
FIG. 5B illustrates an example of task difficulty information, according to various embodiments.

In some embodiments, the guided edit system 200 may infer the difficulty of a task and/or the likelihood that a member may complete a task, based on a response metric (e.g., CTR) associated with the task. Accordingly, the CTR associated with the task may correlate to (or serve as a proxy for) the difficulty of the task, with tasks having higher CTR and being correlated with easier or lightweight tasks and vice versa, and tasks having lower CTRs being correlated to more difficult or heavyweight tasks and vice versa. In some example embodiments, the system 200 may reorder a list of candidate profile edit tasks based on the difficulty of each task. For example, the guided edit system 200 may access task difficulty information identifying a difficulty classification associated with each of various tasks, such as the task difficulty information 501 illustrated in FIG. 5B. The difficulty classification associated with each task may be, for example, one of easy, medium, or hard, or one of lightweight and heavyweight, or a number within a predetermined range of numbers, (such as the range 0 to 1, 1 to 10, 1 to 100, etc.). In some embodiments, the guided edit system 200 may generate the task difficulty information 501, where the difficulty classification of each task may be determined based on the CTR or another response metric associated with that task (e.g., tasks with a CTR higher than a predetermined threshold may be classified as easy tasks, otherwise, they may be classified as difficult tasks), as described above. The difficulty classification associated with each task may also be determined in other ways, such as receiving user input regarding the difficulty of each task (e.g., via user responses to surveys or questionnaires, or from comments or questions received from users, etc.).

Figure 5C:
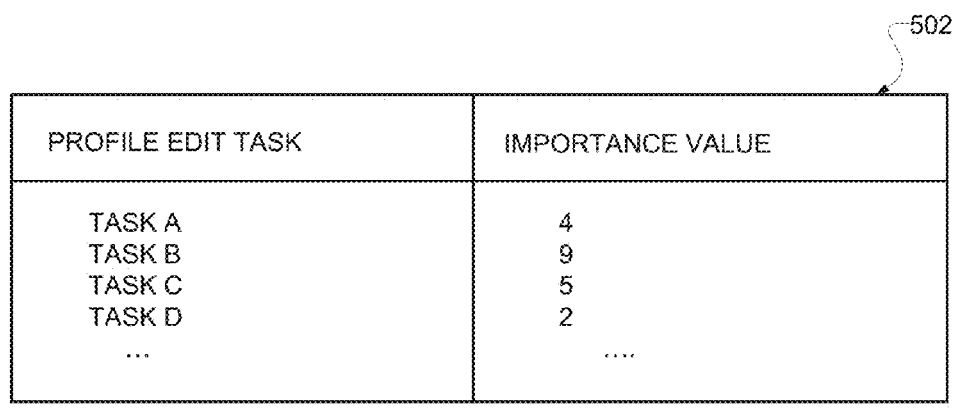
FIG. 5C illustrates an example of task importance information, according to various embodiments.

In some embodiments, the guided edit system 200 may reorder the list of profile edit tasks based on an importance value associated with each profile edit task. For example, the guided edit system 200 may access task importance information identifying importance values associated with each of various tasks, such as the task importance information 502 illustrated in FIG. 5C. The task importance information may be stored locally at, for example, the database 206 illustrated in FIG. 2, or may be stored remotely at a database, data repository, storage server, etc., that is accessible by the guided edit system 200 via a network (e.g., the Internet). In some embodiments, the task with the highest importance value may be placed at the top of the re-ordered list, the task with the second highest importance value may be placed second in the list, and so on, and the system 200 may prompt the member to perform each task based on the updated ordering of the list. Thus, the guided edit system 200 may prompt the member to perform the task with the highest importance value first, and then once the member finishes or skips that task, the guided edit system 200 may prompt the member to perform the task with the next highest importance value, and so on. The guided edit system 200 may display a user interface allowing a user of the guided edit system 200 (e.g., administrators or website personnel) to adjust the importance value associated with each of the profile edit tasks.

In some embodiments, the importance value may represent the importance or value of the completion of that task to the overall completeness, quality, value, impact, success, etc. of the member's profile. In other words, the importance value may represent the impact the performance of that task may have on a member's profile quality (e.g., in terms of an increase in profile views, member connections, messages received such as LinkedIn® InMails, and so on). For example, adding a photo may lead to a huge increase in profile views, whereas adding a skill may lead to a small increase in profile views. Thus, by placing tasks having a greater importance higher up in the list of profile edit tasks, people may receive more value sooner out of the guided edit process. In some embodiments, the importance value may represent the importance of the completion of that task from the business or financial perspective of a website or social network ecosystem. As one example, websites or social networks often serve advertisements and other content to members based on the current location of the member. Thus, the completion of a profile edit task whereby the member adds their location to their profile may be very important or valuable from a business perspective of a social network, notwithstanding its impact on profile views for the member profile. Thus, by placing tasks having a greater importance higher up in the list of profile edit tasks, websites or social networks may receive greater business benefits out of the guided edit process. The guided edit system 200 may display a user interface allowing a user of the guided edit system 200 (e.g., administrators or website personnel) to adjust the importance value associated with each of the profile edit tasks.

In some embodiments, the guided edit system 200 may reorder a list of profile edit tasks based on any combination of response metrics, difficulty classifications, or importance values associated with each profile edit task. The guided edit system 200 may display a user interface allowing a user of the guided edit system 200 (e.g., administrators or website personnel) to adjust weights associated with each of the factors (response metrics, importance values, etc.) that can be utilized for ranking the list of profile edit tasks.

Figure 6:
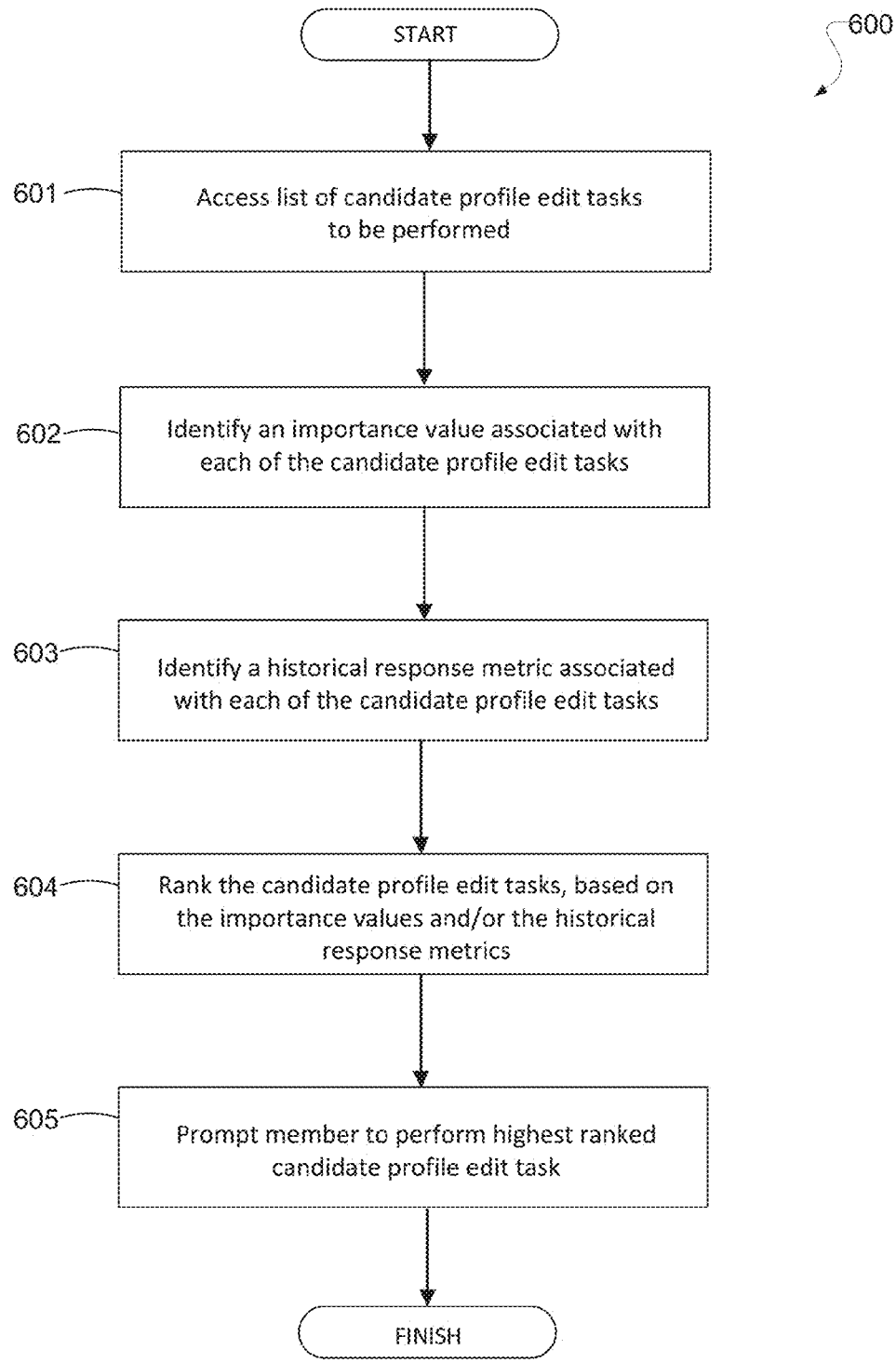
FIG. 6 is a flowchart illustrating an example method, according to various embodiments.

FIG. 6 is a flowchart illustrating an example method 600, consistent with various embodiments described above. The method 600 may be performed at least in part by, for example, the guided edit system 200 illustrated in FIG. 2 (or an apparatus having similar modules, such as one or more client machines or application servers). In operation 601, the determination module 202 accesses profile edit task information associated with a member of an online social network service, the profile edit task information identifying a list of one or more candidate profile edit tasks to be performed to update a member profile page of the member. In some embodiments, the list may be edited to remove candidate profile edit tasks that have already been performed by the member. In operation 602, the determination module 202 identifies an importance value associated with each of the candidate profile edit tasks in the list accessed in operation 601. In operation 603, the determination module 202 identifies an historical response metric value (e.g., CTR) associated with each of the candidate profile edit tasks in the list accessed in operation 601. In operation 604, the determination module 202 ranks each of the candidate profile edit tasks, based on the importance values accessed in operation 602 and/or the historical response metrics accessed in operation 603. For example, the determination module 202 may rank, sort, filter, or order the list of candidate profile edit tasks based on a historical CTR for each task, with the task having the highest CTR being at the top of the list, and the task having the lowest CTR being at the bottom of the list. As another example, the determination module 202 may rank, sort, filter, or order the list of candidate profile edit tasks based on the importance of each task (as indicated by an importance value associated with each task), with the task having the highest importance being at the top of the list, and the task having the lowest importance being at the bottom of the list. In operation 605, the prompt module 204 prompts the member to perform the highest ranked candidate profile edit task in the list, based on the ranking performed in operation 604. It is contemplated that the operations of method 600 may incorporate any of the other features disclosed herein. Various operations in the method 600 may be omitted or rearranged, as necessary. For example, operation 602 or operation 603 may be omitted.

In some example embodiments, instead of showing the same profile edit task to a member until he skips or completes the task, the system 200 may perform an "impression discounting" technique by moving on to the next task, if that member has viewed the same task prompt a number of times. The inventors have determined that the CTR of every task decreases exponentially with its number of impressions to a particular member. Accordingly, if the guided edit system 200 determines that a member has viewed a prompt inviting them to perform a specific profile edit task (e.g., see FIG. 4) a predetermined number of times (e.g., during a predetermined time interval), then the system 200 may avoid prompting that member to perform that profile edit task, and may begin prompting the member to perform another profile edit task (e.g., the next profile edit task in a list of candidate profile edit tasks). The guided edit system 200 may display a user interface allowing a user of the guided edit system 200 (e.g., administrators or website personnel) to adjust the aforementioned predetermined number and/or predetermined time interval (e.g., associated with all or each of the profile edit tasks). The guided edit system 200 may determine the prompts the member has already viewed by, for example, accessing log history information identifying content (e.g., profile edit task prompts) displayed to each member. Such log history information may be stored locally at, for example, the database 206 illustrated in FIG. 2, or may be stored remotely at a database, data repository, storage server, etc., that is accessible by the guided edit system 200 via a network (e.g., the Internet).

Figure 7:
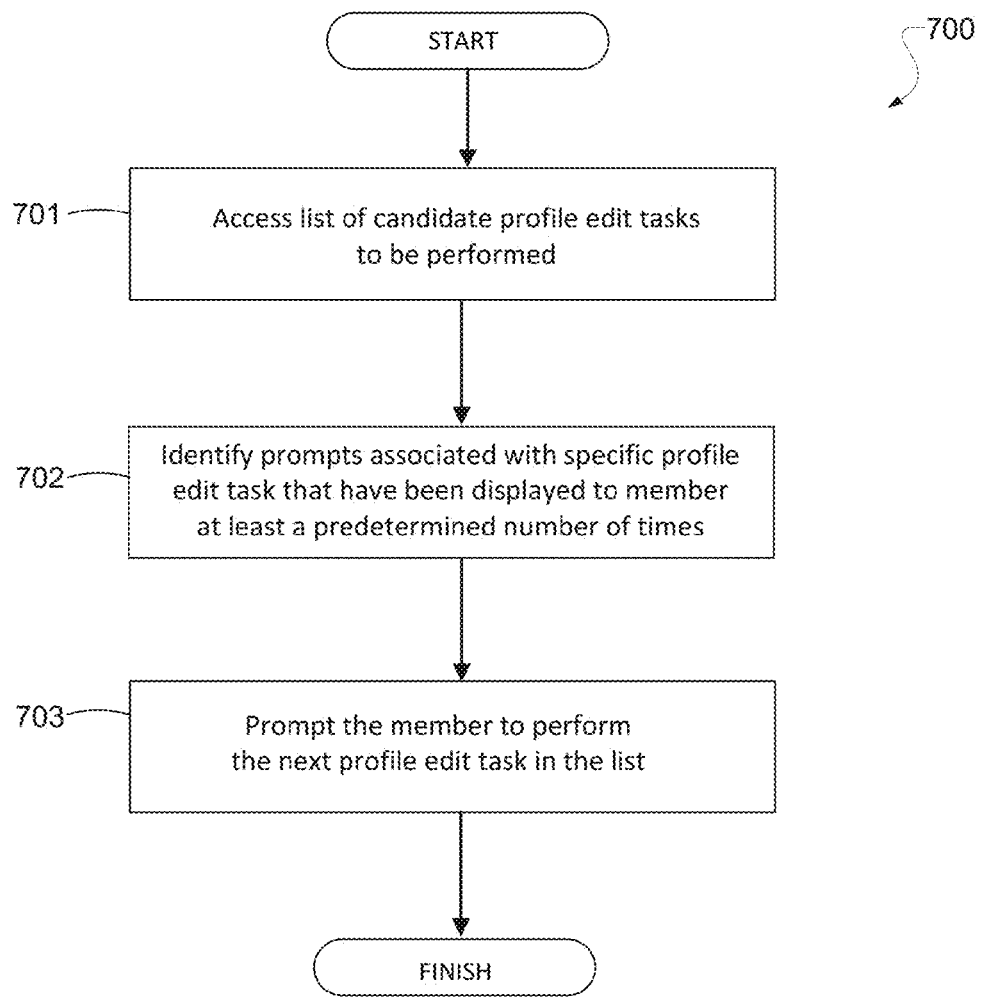
FIG. 7 is a flowchart illustrating an example method, according to various embodiments.

FIG. 7 is a flowchart illustrating an example method 700, consistent with various embodiments described above. The method 700 may be performed at least in part by, for example, the guided edit system 200 illustrated in FIG. 2 (or an apparatus having similar modules, such as one or more client machines or application servers). In operation 701, the determination module 202 accesses profile edit task information associated with a member of an online social network service, the profile edit task information identifying a list of one or more candidate profile edit tasks to be performed to update a member profile page of the member. In some embodiments, the list may be edited to remove candidate profile edit tasks that have already been performed by the member. In operation 702, the determination module 202 identifies prompts associated with a specific profile edit task (in the list accessed in operation 701) that have been displayed to a member at least a predetermined number of times. For example, the prompts may have invited the member to update their member profile page by performing a specific profile edit task (e.g., see FIG. 4). In operation 703, the prompt module 204 prompts the member to perform the next profile edit task in the list accessed in operation 701 (e.g., the next task after the specific profile task identified in operation 702). It is contemplated that the operations of method 700 may incorporate any of the other features disclosed herein. Various operations in the method 700 may be omitted or rearranged, as necessary.

In some embodiments, instead of showing the tasks in the same order to everyone, the system 200 may dynamically determine the order of tasks based on the state of the profile of a member and recent profile update tasks performed by that member. For example, if a member has just completed a heavyweight task like editing their summary, then it is more likely that he is in a flow or mode of profile editing (also referred to herein as a profile edit session) and is therefore more likely to finish another heavyweight task like adding a photo. Accordingly, for such a member, the system 200 may prompt the member to perform another heavyweight task after he finishes the current heavyweight task. However, if a member has not recently completed a heavyweight task (e.g., even after the member has been prompted a number of times), the system 200 may follow up with a prompt for a lightweight task. The guided edit system 200 may determine the prompts the member has already viewed or the profile edit tasks the member has already performed by, for example, accessing log history information identifying content (e.g., profile edit task prompts) displayed to each member and profile edit tasks performed by each member. Such log history information may be stored locally at, for example, the database 206 illustrated in FIG. 2, or may be stored remotely at a database, data repository, storage server, etc., that is accessible by the guided edit system 200 via a network (e.g., the Internet).

Figure 8:
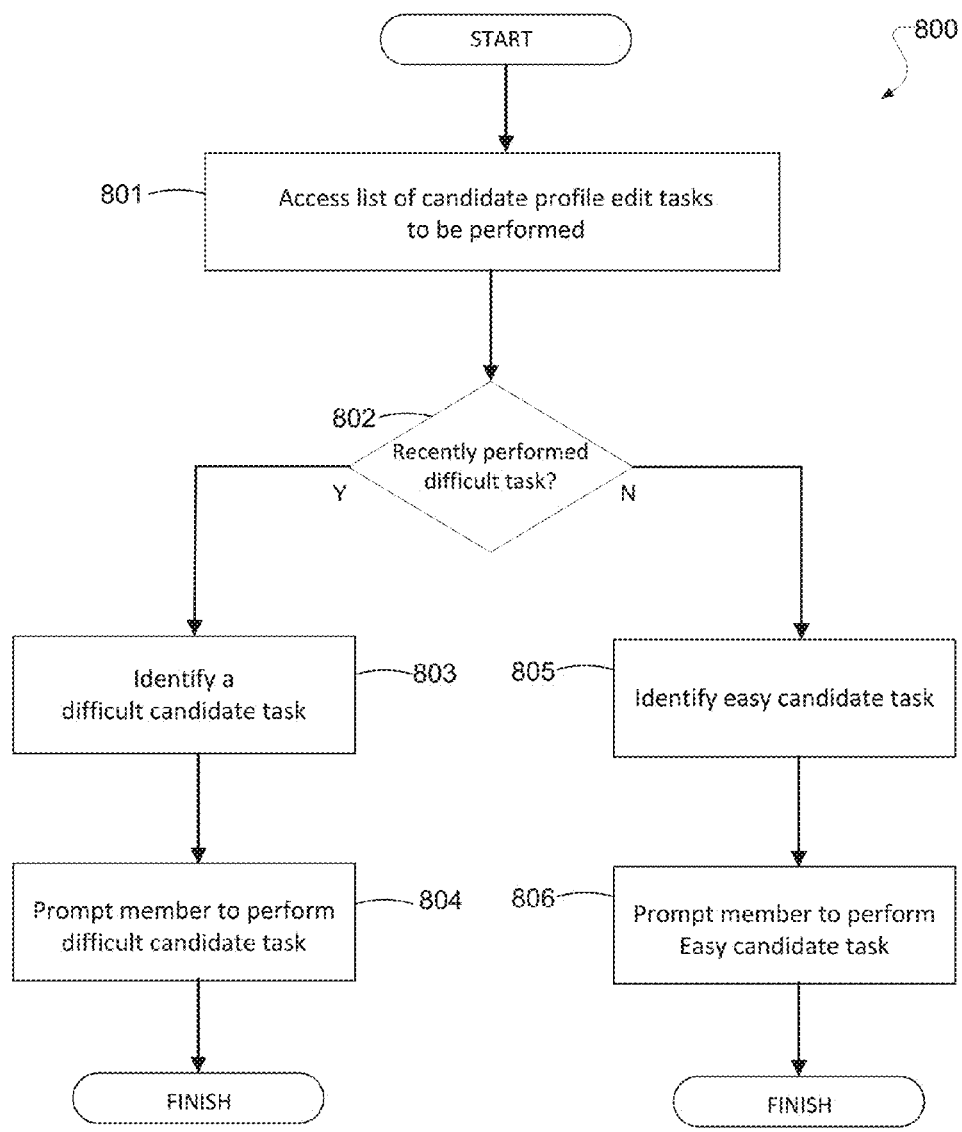
FIG. 8 is a flowchart illustrating an example method, according to various embodiments.

FIG. 8 is a flowchart illustrating an example method 800, consistent with various embodiments described above. The method 800 may be performed at least in part by, for example, the guided edit system 200 illustrated in FIG. 2 (or an apparatus having similar modules, such as one or more client machines or application servers). In operation 801, the determination module 202 accesses profile edit task information associated with a member of an online social network service, the profile edit task information identifying a list of one or more candidate profile edit tasks to be performed to update a member profile page of the member. In some embodiments, the list may be edited to remove candidate profile edit tasks that have already been performed by the member. In operation 802, the determination module 202 determines whether the member recently completed a profile edit task classified as a difficult task (e.g., editing a profile summary of the member profile page). For example, the determination module 202 may access log data identifying user actions performed by the member, in order to determine which profile edit tasks have been performed recently (e.g., within a predetermined time interval, such as the last minute, last 30 minutes, last hour, etc.). The guided edit system 200 may display a user interface allowing a user of the guided edit system 200 (e.g., administrators or website personnel) to specified the aforementioned predetermined time interval. The determination module 202 may then access task difficulty information (e.g., see FIG. 5B) identifying a difficulty classification (e.g., difficult or easy) associated with various profile edit tasks. In some embodiments, the determination module 202 may determine that the member has not recently completed the profile edit task classified as a difficult task, based on determining that a predetermined number of prompts have been displayed to the member, the prompts inviting the member to perform the profile edit task classified as the difficult task.

Referring back to FIG. 8, if the determination module 202 determines that the member has recently performed a difficult profile edit task (802, Yes), then in operation 803, the determination module 202 identifies a specific one of the candidate profile edit tasks accessed in operation 801 that is classified as a difficult task (e.g., adding a member photo to the member profile page). For example, the prompt module 204 may access task difficulty information (e.g., see FIG. 5B) identifying a difficulty classification (e.g., difficult or easy) associated with various profile edit tasks. In operation 804, the prompt module 204 prompts the member to perform the specific profile edit task identified in operation 803.

Referring back to FIG. 8, if the determination module 202 determines that the member has not recently performed a difficult profile edit task (802, No), then in operation 805, the determination module 202 identifies one of the candidate profile edit tasks accessed in operation 801 that is classified as an easy task (e.g., adding a skill from a list of one or more suggested skills). For example, the prompt module 204 may access task difficulty information (e.g., see FIG. 5B) identifying a difficulty classification (e.g., difficult or easy) associated with various profile edit tasks. In operation 806, the prompt module 204 prompts the member to perform the profile edit task identified in operation 805. It is contemplated that the operations of method 800 may incorporate any of the other features disclosed herein. Various operations in the method 800 may be omitted or rearranged, as necessary.

As described above in conjunction with FIG. 8, if the member has recently completed a difficult task (802, Yes), then the member may be presented with another difficult task. It is possible that this flow may continue for a long period of time (e.g., if there are a large number of difficult tasks to perform, and the member continues to perform them). In order to prevent the member being continuously confronted with difficult tasks, the system 200 may not automatically assign a difficult task to the member, but instead may introduce a lightweight task after the member completes the heavyweight task. For example, in some embodiments, if the member has performed a predetermined number of heavyweight tasks (e.g., within a predetermined time period), then a lightweight task may be presented thereafter, instead of a heavyweight task. The guided edit system 200 may display a user interface allowing a user of the guided edit system 200 (e.g., administrators or website personnel) to adjust the aforementioned predetermined number or predetermined time period. In some embodiments, if the member has recently completed a difficult task (802, Yes), then the system 200 may select the next task randomly, with a 90% weighting towards difficult tasks and a 10% weighting towards easy tasks (in other words, there is a 90% chance that the member may be presented with a difficult task). Similarly, if the member has not recently completed a difficult task (802, No), then the system 200 may select the next task randomly, with a 90% weighting towards the easy tasks and a 10% weighting towards the difficult tasks. The aforementioned percentages are merely exemplary, and the guided edit system 200 may display a user interface allowing a user of the guided edit system 200 (e.g., administrators or website personnel) to adjust the aforementioned percentages.

Figure 9:
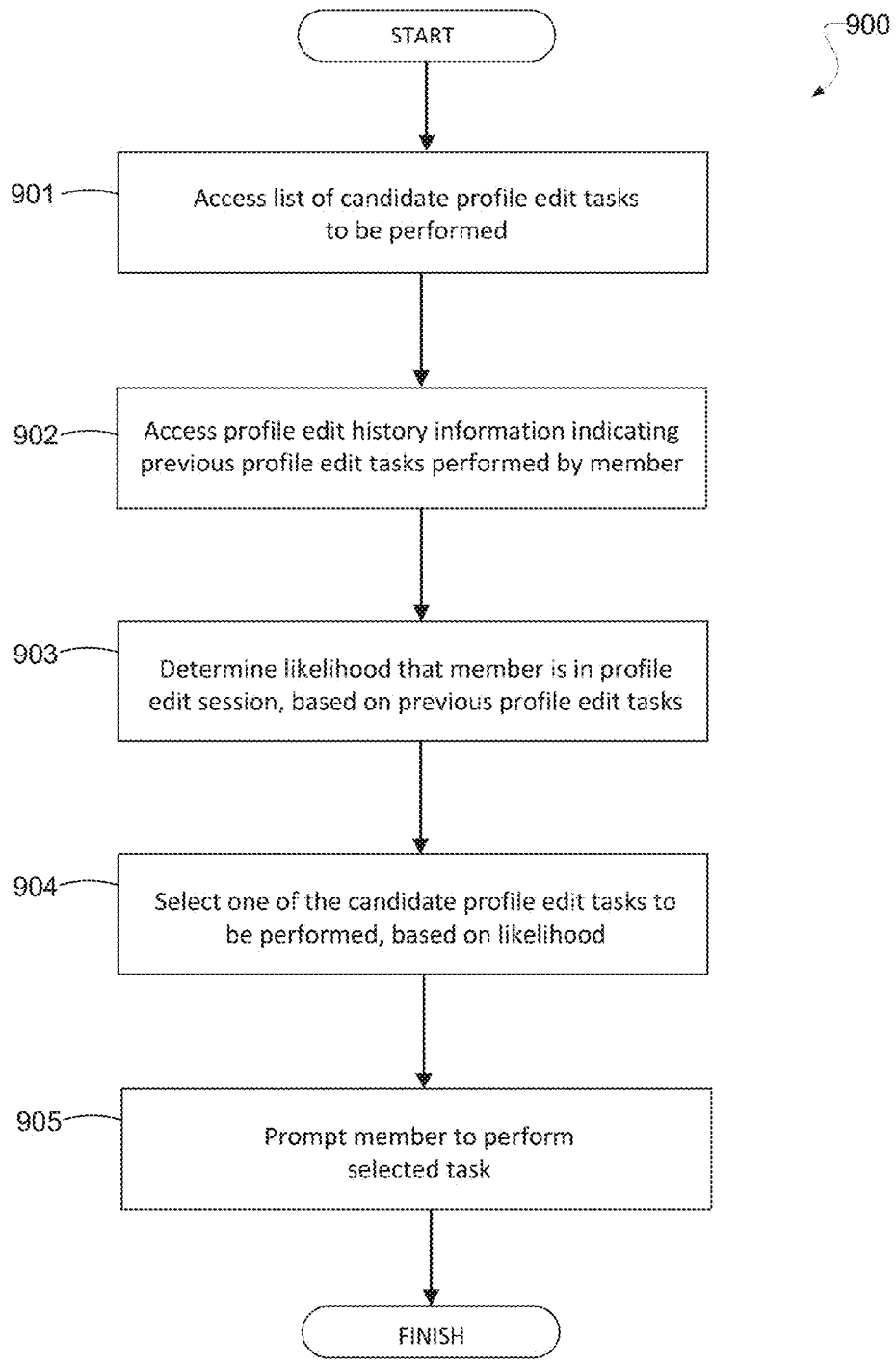
FIG. 9 is a flowchart illustrating an example method, according to various embodiments.

FIG. 9 is a flowchart illustrating an example method 900, consistent with various embodiments described above. The method 900 may be performed at least in part by, for example, the guided edit system 200 illustrated in FIG. 2 (or an apparatus having similar modules, such as one or more client machines or application servers). In operation 901, the determination module 202 accesses profile edit task information associated with a member of an online social network service, the profile edit task information identifying a list of one or more candidate profile edit tasks to be performed to update a member profile page of the member. In some embodiments, the list may be edited to remove candidate profile edit tasks that have already been performed by the member. In operation 902, the determination module 202 accesses profile edit history information indicating previous profile edit tasks performed by the member. For example, the determination module 202 may access log data identifying user actions performed by the member, in order to determine which profile edit tasks have been performed recently (e.g., within a predetermined time interval, such as the last minute, last 30 minutes, last hour, etc.). In operation 903, the determination module 202 determines the likelihood (e.g., probability) that member is in a profile edit session (also known as a profile edit flow or profile edit mode), based on previous profile edit tasks recently performed by the member. For example, if the profile edit history information accessed in operation 902 indicates that the member recently performed a difficult profile edit task (e.g., editing a profile summary of the member profile page, or adding a member photo to the member profile page), then the determination module 202 may determine that it is more likely that the member is in a profile edit session. In operation 904, the determination module 202 identifies a particular one of the profile edit tasks in the list accessed in operation 901, based on the likelihood determined in operation 903. For example, if the prompt module 204 determines that the member is likely in a profile edit session, the determination module 202 may identified a difficult task, whereas if the prompt module 204 determines that the member is likely not in a profile edit session, the determination module 202 may identified an easy task. In operation 905, the prompt module 204 may then prompt the member to perform the task identified in operation 904. It is contemplated that the operations of method 900 may incorporate any of the other features disclosed herein. Various operations in the method 900 may be omitted or rearranged, as necessary.

Various example embodiments described above may be combined. For example, the system 200 may order an existing list of candidate profile edit tasks (which may have a predetermined ordering, e.g., A, B, C, D, etc.) based on a response metric and/or an importance value associated with each of the candidate profile edits tasks, to generate a revised list (e.g., C, A, D, B). Thereafter, when displaying a particular candidate profile edit task to the member (e.g., C), if the system 200 determines that the member has viewed a predetermined number of prompts or invitations to perform that profile edit task, the system 200 may skip past that task and begin displaying prompts to perform that next task in the reordered list (e.g., A). The system 200 may avoid displaying the prompt for the skipped task (e.g., C) until the member has successfully performed all the other tasks per the reordered list (e.g., A, D, and B). Moreover, in some embodiments, if the system 200 determines that the member has just performed a very difficult task, the system 200 may disregard the current ordering of the list, and select another candidate profile edit task classified as a difficult task. The system 200 may repeat this until it determines that the member has not recently performed a difficult task, and then the system 200 may select an easy task to display to the member.

While various example embodiments herein describe optimizing the ordering of a list of profile edit tasks, the embodiments and techniques described herein are not limited merely to profile edit tasks, and are applicable to any type of task(s) to be performed.

Example Mobile Device

Figure 10:
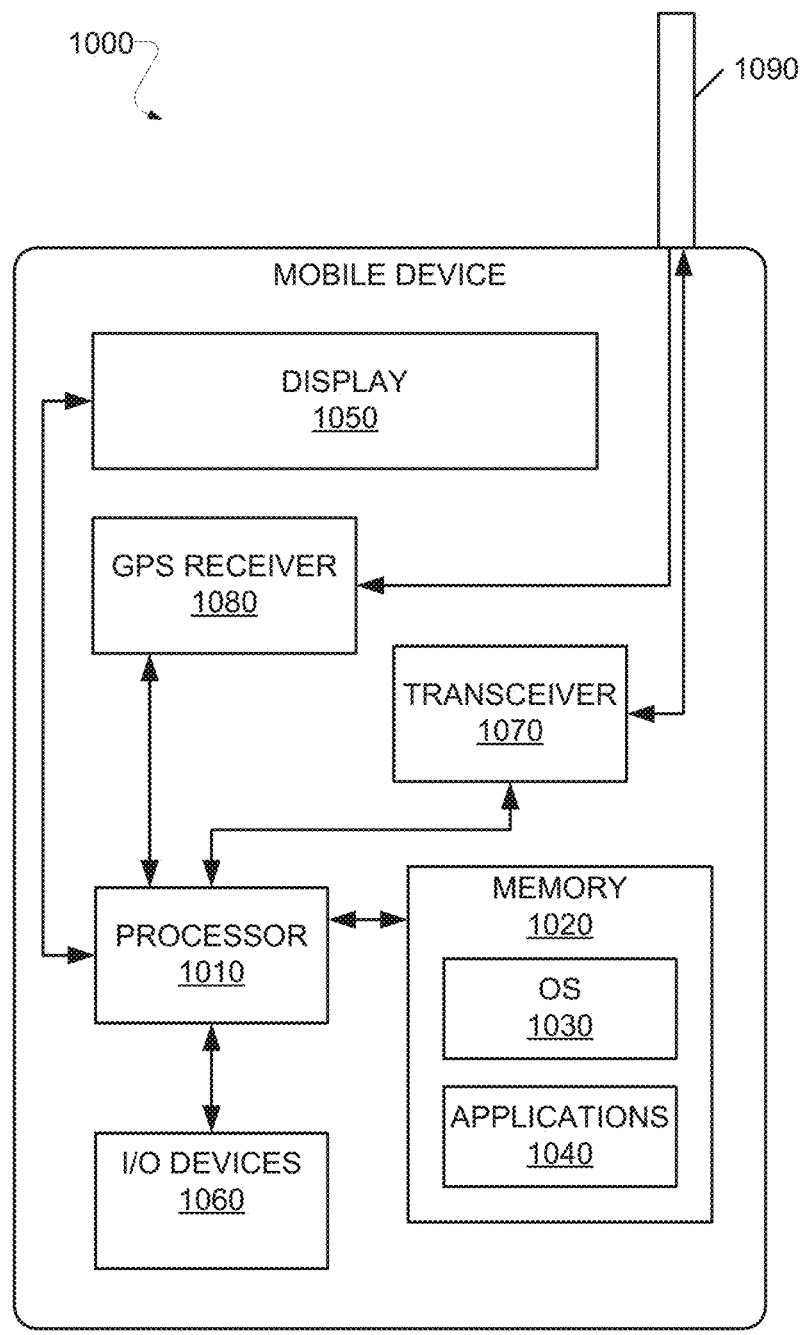
FIG. 10 illustrates an example mobile device, according to various embodiments.

FIG. 10 is a block diagram illustrating the mobile device 1000, according to an example embodiment. The mobile device may correspond to, for example, one or more client machines or application servers. One or more of the modules of the system 200 illustrated in FIG. 2 may be implemented on or executed by the mobile device 1000. The mobile device 1000 may include a processor 1010. The processor 1010 may be any of a variety of different types of commercially available processors suitable for mobile devices (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory, is typically accessible to the processor 1010. The memory 1020 may be adapted to store an operating system (OS) 1030, as well as application programs 1040, such as a mobile location enabled application that may provide location based services to a user. The processor 1010 may be coupled, either directly or via appropriate intermediary hardware, to a display 1050 and to one or more input/output (I/O) devices 1060, such as a keypad, a touch panel sensor, a microphone, and the like. Similarly, in some embodiments, the processor 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile device 1000. Further, in some configurations, a GPS receiver 1080 may also make use of the antenna 1090 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
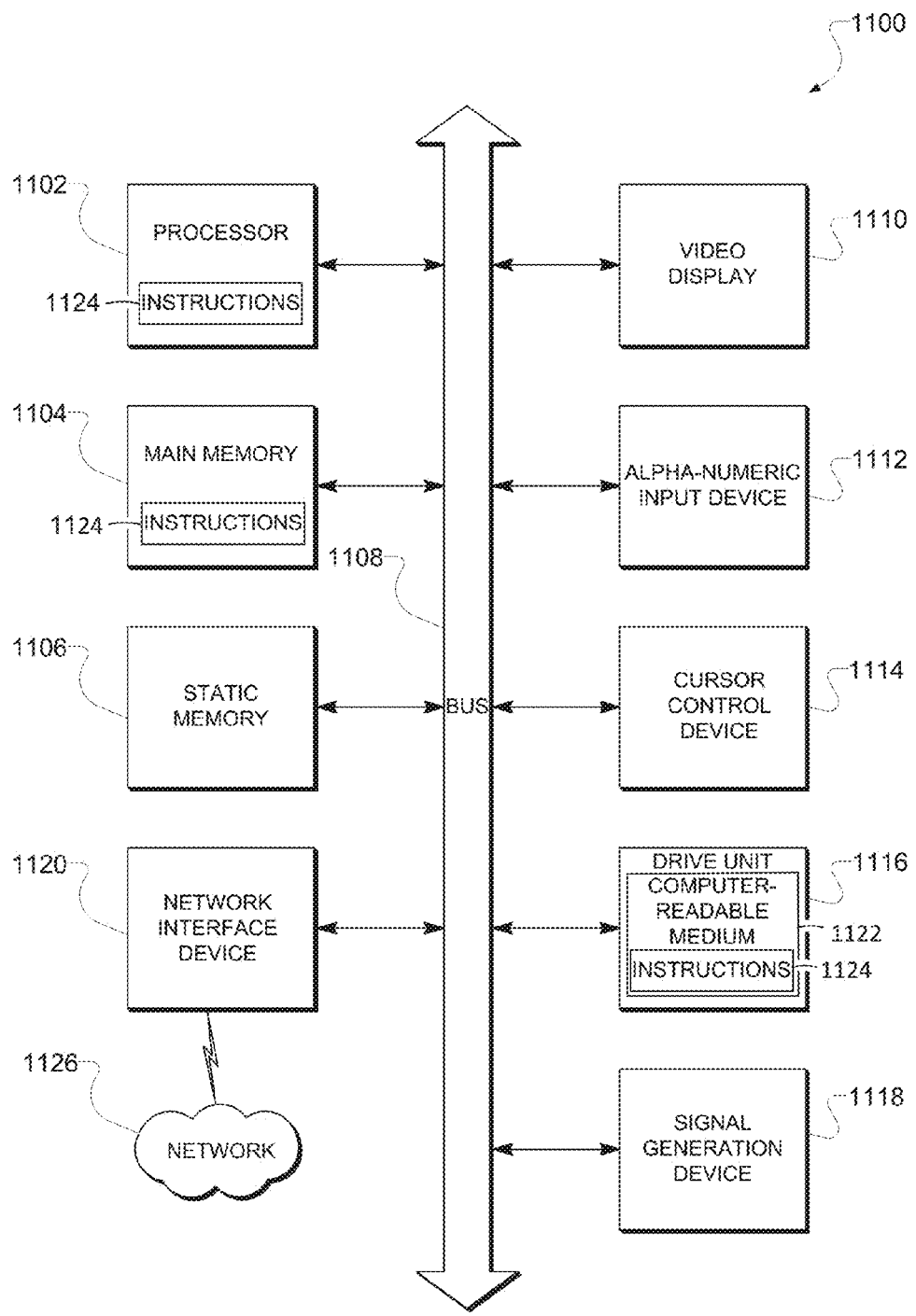
FIG. 11 is a diagrammatic representation of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing profile edit task information associated with a member of an online social network service, the profile edit task information identifying one or more candidate profile edit tasks to be performed to update a member profile page of the member;
   determining the member completed a profile edit task of the one or more candidate profile edit tasks, the profile edit task classified as a difficult task based on a response metric associated with other members of the online social network service completing the profile edit task, the difficult task classification indicating, at least in part, a heavyweight task;
   based on determining the member completed the profile edit task classified as the difficult task, inferring a mode of the member conducive to completing profile edit tasks classified as difficult tasks;
   responsive to inferring the mode of the member conducive to completing profile edit tasks classified as difficult tasks, identifying an additional profile edit task classified as a difficult task from the one or more candidate profile edit tasks; and
   prompting the member to perform the additional profile edit task.

2. The method of claim 1, further comprising:
   responsive to determining that the member has not completed the profile edit task classified as the difficult task, identifying another profile edit task classified as an easy task the one or more candidate profile edit tasks; and
   prompting the member to perform the another profile edit task.

3. The method of claim 2, wherein it is determined that the member has not completed the profile edit task classified as the difficult task, based on determining that a predetermined number of prompts have been displayed to the member, the prompts inviting the member to perform the profile edit task classified as the difficult task.

4. The method of claim 1, wherein the additional profile edit task classified as the difficult task is identified based on task difficulty information, the task difficulty information identifying one or more profile edit tasks and a difficulty classification associated with each of the one or more profile edit tasks.

5. The method of claim 1, wherein the additional profile edit task is classified as the difficult task based on a particular response metric associated with the additional profile edit task.

6. The method of claim 1, wherein the prompting further comprises:
   displaying, via a user interface, a prompt that invites the member to update their member profile page by performing the additional profile edit task.

7. The method of claim 1, wherein the prompting further comprises:
   transmitting a message to the member that invites the member to update their member profile page by performing the additional profile edit task.

8. The method of claim 7, wherein the message is at least one of an email, a text message, a social network instant message, and a chat message.

9. The method of claim 1, wherein the additional profile edit task classified as a difficult task includes editing a profile summary of the member profile page.

10. The method of claim 1, wherein the additional profile edit task classified as a difficult task includes adding a member photo to the member profile page.

11. A system comprising:
a machine including a memory and at least one processor;
a determination module, executable by the machine, configured to:
access profile edit task information associated with a member of an online social network service, the profile edit task information identifying one or more candidate profile edit tasks to be performed to update a member profile page of the member;
determine the member completed a profile edit task of the one or more candidate profile edit tasks, the profile edit task classified as a difficult task based on a response metric associated with other members of the online social network service completing the profile edit task, the difficult task classification indicates, at least in part, a heavyweight task;
based on determining the member completed the profile edit task classified as the difficult task, infer a mode of the member conducive to completing profile edit tasks classified as difficult tasks;
responsive to inferring the mode of the member conducive to completing profile edit tasks classified as difficult tasks; identify an additional profile edit task classified as a difficult task from the one or more candidate profile edit tasks; and
a prompt module configured to prompt the member to perform the additional profile edit task.

12. The system of claim 11, wherein the determination module is further configure to, responsive to determining that the member has not completed the profile edit task classified as the difficult task, identify another profile edit task classified as an easy task from the one or more candidate profile edit tasks, and
wherein the prompt module is further configured to prompt the member to perform the another profile edit task.

13. The system of claim 12, wherein it is determined that the member has not completed the profile edit task classified as the difficult task, based on determining that a predetermined number of prompts have been displayed to the member, the prompts inviting the member to perform the profile edit task classified as the difficult task.

14. The system of claim 11, wherein the additional profile edit task classified as the difficult task is identified based on task difficulty information, the task difficulty information identifying one or more profile edit tasks and a difficulty classification associated with each of the one or more profile edit tasks.

15. The system of claim 11, wherein the additional profile edit task is classified as the difficult task based on a particular response metric associated with the additional profile edit task.

16. A non-transitory machine-readable storage medium comprising instructions that, when executed by one or more processors of a machine, cause the machine to perform operations comprising:
accessing profile edit task information associated with a member of an online social network service, the profile edit task information identifying one or more candidate profile edit tasks to be performed to update a member profile page of the member;
determining the member completed a profile edit task of the one or more candidate profile edit tasks, the profile edit task classified as a difficult task based on a response metric associated with other members of the online social network service completing the profit edit task, the difficult task classification indicating, at least in part, a heavyweight task;
based on determining the member completed the profile edit task classified as the difficult task, inferring a mode of the member conducive to completing profile edit tasks classified as difficult tasks;
responsive to inferring the mode of the member conducive to completing profile edit tasks classified as difficult tasks, identifying an additional profile edit task classified as a difficult task from the one or more candidate profile edit tasks; and
prompting the member to perform the additional profile edit task.

17. The storage medium of claim 6, wherein the operations further comprise:
responsive to determining that the member has not completed the profile edit task classified as the difficult task, identifying another profile edit task classified as an easy task from the one or more candidate profile edit tasks; and
prompting the member to perform the another profile edit task.

18. The storage medium of claim 17, wherein the operations further comprise:
determining that the member has not completed the profile edit task classified as the difficult task, based on determining that a predetermined number of prompts have been displayed to the member, the prompts inviting the member to perform the profile edit task classified as the difficult task.

19. The storage medium of claim 16, wherein the additional profile edit task classified as the difficult task is identified based on task difficulty information, the task difficulty information identifying one or more profile edit tasks and a difficulty classification associated with each of the one or more profile edit tasks.

20. The storage medium of claim 16, wherein the additional profile edit task is classified as the difficult task based on a particular response metric associated with the specific candidate profile edit task.

* * * * *

UNITED STATES PATENT AND TRADEMARK OFFICE
CERTIFICATE OF CORRECTION

| | | |
|---|---|---|
| PATENT NO. | : 9,253,226 B2 | Page 1 of 1 |
| APPLICATION NO. | : 14/319521 | |
| DATED | : February 2, 2016 | |
| INVENTOR(S) | : Jain et al. | |

It is certified that error appears in the above-identified patent and that said Letters Patent is hereby corrected as shown below:

In the Claims

In column 16, line 33, in Claim 2, after "task", insert --from--, therefor

In column 17, line 26, in Claim 11, delete "tasks;" and insert --tasks,--, therefor In column 18, line 13, in Claim 16, delete "profit" and insert --profile--, therefor Signed and Sealed this
Sixteenth Day of August, 2016

Michelle K. Lee
*Director of the United States Patent and Trademark Office*